(12) United States Patent
Dooley et al.

(10) Patent No.: US 8,674,013 B2
(45) Date of Patent: Mar. 18, 2014

(54) METHODS FOR PREPARING REINFORCED FLUOROPOLYMER COMPOSITES COMPRISING SURFACE FUNCTIONALIZED NANOCRYSTALLINE CELLULOSE

(75) Inventors: Brynn Mary Dooley, Toronto (CA); Yu Qi, Oakville (CA); Carolyn Moorlag, Mississauga (CA); Qi Zhang, Milton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/446,541

(22) Filed: Apr. 13, 2012

(65) Prior Publication Data

US 2013/0274384 A1  Oct. 17, 2013

(51) Int. Cl.
*C08L 27/12* (2006.01)
*C08B 15/00* (2006.01)

(52) U.S. Cl.
USPC ............. 524/462; 524/35; 536/56; 8/116.1

(58) Field of Classification Search
USPC ................................................. 527/100
See application file for complete search history.

(56) References Cited

U.S. PATENT DOCUMENTS 5,470,409 A * 11/1995 Deakyne et al. ............. 156/62.4
2011/0260348 A1* 10/2011 Gardner et al. .................. 264/7

OTHER PUBLICATIONS

Cunha, A. G.; Freire, C. S. R.; Silvestre, A. J. D.; Neto, C. P.; Gandini, A.; Orblin, E.; and Fardim, P. Highly Hydrophobic Biopolymers Prepared by the Surface Pentafluorobenzoylation of Cellulose Substrates, Apr. 2007, Biomacromolecules, vol. 8, pp. 1347-1352.*
Belgacem, B. N. and Gandini, A. The Surface Modification of Cellulose Fibres for Use as Reinforcing Elements in Composite Materials, 2005, Composite Interfaces, vol. 12, No. 1-2, pp. 41-75.*
Gardner, D. J.; Oporto, G. S.; Mills, R.; and Samir, M. A. S. A. Adhesion and Surface Issues in Cellulose and Nanocelllulose, 2008, Journal of Adhesion Science and Technology, vol. 22, pp. 545-567.*
Hasani, M.; Cranston, E.; Westman, G.; and Gray, D. Cationic surface functionalization of cellulose nanocrystals. Soft Matter, 2008, vol. 4, pp. 2238-2244.*
Habibi et al., "Cellulose Nanocrystals: Chemistry, Self-Assembly, and Applications", Chem. Rev., 110, pp. 3479-3500 (2010).
Kloser et al., "Surface Grafting of Cellulose Nanocrystals with Poly-(ethylene oxide) in Aqueous Media", Langmuir, 26(16), pp. 13450-13456 (2010).
Cranston et al., "Direct Surface Force Measurements of Polyelectrolyte Multilayer Films Containing Nanocrystalline Cellulose", Langmuir, 26(22), pp. 17190-17197 (2010).
Sassi et al., "Ultrastructural Aspects of the Acetylation of Cellulose", Cellulose, 2, pp. 111-127 (1995).
Cunha et al., "Bi-phobic Cellulose Fibers Derivatives via Surface Trifluoropropanoylation", Langmuir, 23, pp. 10801-10806 (2007).
Gousséet al., "Stable Suspensions of Partially Silylated Cellulose Whiskers Dispersed in Organic Solvents", Polymer, 43, pp. 2645-2651 (2002).
Gousséet al., "Surface Silylation of Cellulose Microfibrils: Preparation and Rheological Properties, Polymer", 45, pp. 1569-1575 (2004).
Navarro et al., "Highly Hydrophobic Sisal Chemithermomechanical Pulp (CTMP) Paper by Fluorotrimethylsilane Plasma Treatment", Cellulose, 10, pp. 411-424 (2003).
Yuan et al., "Surface Acylation of Cellulose Whiskers by Drying Aqueous Emulsion", Biomacromolecules, 7, pp. 696-700 (2006).
Siqueira et al., "Cellulose Whiskers versus Microfibrils: Influence of the Nature of the Nanoparticle and its Surface Functionalization on the Thermal and Mechanical Properties of Nanocomposites", Biomacromolecules, 10, pp. 425-432 (2009).
Grunert et al., "Progress in the Development of Cellulose Reinforced Nanocomposites", Polymer Materials: Science and Engineering, 82, p. 232 (2000).
Junior De Menezes et al., "Extrusion and Characterization of Functionalized Cellulose Whiskers Reinforced Polyethylene Nanocomposites", Polymer, 50, pp. 4552-4563 (2009).
Dooley et al., U.S. Appl. No. 13/446,519, filed Apr. 13, 2012.
Moorlag et al., U.S. Appl. No. 13/446,224, filed Apr. 13, 2012.
Moorlag et al., U.S. Appl. No. 13/446,227, filed Apr. 13, 2012.
Moorlag et al., U.S. Appl. No. 13/446,267, filed Apr. 13, 2012.

* cited by examiner

*Primary Examiner* — Robert C Boyle
*Assistant Examiner* — Stephen Rieth
(74) *Attorney, Agent, or Firm* — Oliff PLC

(57) ABSTRACT

A method of preparing a reinforced fluoropolymer composite is presented, which includes reacting a surface of a nanocrystalline cellulose with a fluorinated electrophile to form a fluoro-functionalized nanocrystalline in which the outer circumference of the nanocrystalline cellulose has been functionalized with fluorinated substrates, and contacting the fluoro-functionalized nanocrystalline cellulose with a fluoropolymer to form a fluoropolymer composite. Also presented is a method of preparing fluoro-functionalized nanocrystalline cellulose, including reacting a surface of a nanocrystalline cellulose with a fluorinated electrophile forming fluoro-functionalized nanocrystalline cellulose in which the outer circumference of the nanocrystalline cellulose has been functionalized with fluorinated substrates, precipitating the fluoro-functionalized nanocrystalline cellulose and isolating and purifying the fluoro-functionalized nanocrystalline cellulose.

14 Claims, No Drawings

METHODS FOR PREPARING REINFORCED FLUOROPOLYMER COMPOSITES COMPRISING SURFACE FUNCTIONALIZED NANOCRYSTALLINE CELLULOSE

CROSS-REFERENCE TO RELATED APPLICATIONS

Commonly assigned U.S. patent application Ser. No. 13/446,267, entitled "Bionanocomposite Fuser Topcoats Comprising Nanosized Cellulosic Particles," to Carolyn Moorlag et al.; U.S. patent application Ser. No. 13/446,224, entitled "Fuser Member," to Carolyn Moorlag et al.; U.S. patent application Ser. No. 13/446,227, entitled "Composition of Matter," to Carolyn Moorlag et al.; and U.S. patent application Ser. No. 13/446,519, entitled "Reinforced Fluoropolymer Composites Comprising Surface Functionalized Nanocrystalline Cellulose," to Brynn Dooley et al., respectively, concurrently filed herewith, the disclosures of which are totally incorporated herein by reference in their entireties, describe nanocrystalline cellulose, methods for preparing structures comprising nanocrystalline cellulose and applications of nanocrystalline cellulose.

TECHNICAL FIELD

This disclosure is generally directed to nanocrystalline cellulose and, more specifically, to methods of preparing reinforced fluoropolymer composites and incorporating fluoro-functionalized nanocrystalline cellulose in which the outer circumference of the nanocrystalline cellulose has been functionalized with a fluorinated substrate, into polymer matrices to enhance adhesion between nanocrystalline cellulose particles and fluoropolymers in a composite material.

BACKGROUND

Cellulose fibers and their derivatives constitute the most abundant renewable polymer resource available. Cellulose fibers are also economically viable substances due to their low cost, availability, renewability, and physical properties. As a result, they have been subject to a variety of research for their ability to be applied as reinforcing agents.

Conventionally, cellulose is used as a construction material (wood), as a natural textile (cotton and flax), and for paper and board. Moreover, high performance cellulose-based materials are used throughout industry and everyday life. In all of these applications, cellulose-cellulose and cellulose-polymer interactions are vital, but not well-understood.

Recently, research regarding nanocrystalline cellulose (NCC) has become increasingly popular, particularly because of their renewability and sustainability, as well as their applications as reinforcing agents. NCC can be derived from cellulose fibers by hydrolyzing the amorphous and paracrystalline regions of cellulose fibers by either enzymatic or acidic hydrolysis, and dispersing them in water. The resulting crystalline nanoparticles are exceptionally tough, with an axial Young's modulus that is theoretically similar to that of KEVLAR®, making them desirable for use as reinforcing fillers in composite systems. NCCs also have an abundance of hydroxyl groups and anionically charged functional groups (carboxylate, sulfate) at the surface. This charged hydrogen-bonding surface results in insolubility and poor dispersion in low dielectric media and is expected to result in agglomeration of the NCC when it is incorporated into a fluoropolymer composite. However, the abundance of hydroxyl groups at the NCC surface allows for various chemical modifications to be performed.

One type of chemical surface modification may include functionalization. Many chemical functionalizations have been primarily conducted to (1) introduce stable negative or positive electrostatic charges on the surface of NCCs to obtain better dispersion, and (2) enhance surface energy characteristics to improve compatibility when used in conjunction with non-polar or hydrophobic matrices in nanocomposites.

NCCs present an alternative to fillers (i.e., inorganic, carbon nanotubes) in composite systems owing to its natural abundance, unique material properties, and sustainability. For example, although fluoropolymers are often characterized by their superior chemical and thermal stability and low coefficient of friction, fillers are often required to improve fluoropolymer mechanical strength. However, such fillers are limited in nature. Although NCCs can be an effective alternative to fillers, it remains a challenge to chemically functionalize NCC surfaces in a way such that NCC morphology and crystalline structure are preserved. Further, although NCCs may form stable suspensions in aqueous media, they still cannot be easily dispersed in non-polar solvents or polymers. Thus, there is a need to provide functionalized NCC surfaces to be successfully employed as a reinforcing material in fluoropolymer composites.

REFERENCES

Habibi et al., Cellulose Nanocrystals: Chemistry, Self-Assembly, and Applications, Chem. Rev., 110, pp. 3479-3500 (2010), discloses the chemistry of cellulose nanocrystals, properties of cellulose nanocrystals, self-assembly and organization of cellulose nanocrystals, structure and morphology of cellulose, preparation processing methods of cellulose nanocrystals, chemical modifications of cellulose nanocrystals, and applications of cellulose nanocrystals.

Kloser et al., Surface Grafting of Cellulose Nanocrystals with Poly(ethylene oxide) in Aqueous Media, Langmuir, 26(16), pp. 13450-13456 (2010) discloses aqueous suspensions of poly(ethylene oxide)-grafted nanocrystalline cellulose (PRO-grafted NCC) prepared to achieve steric stabilization. A two-step process was employed: in the first step, NCC suspensions prepared by sulfuric acid hydrolysis were desulfated with sodium hydroxide, and in the second step, the surfaces of the crystals were functionalized with epoxy-terminated poly(ethylene oxide) (PRO epoxide) under alkaline conditions. Upon concentration of the PRO-grafted aqueous NCC suspension, a chiral nematic phase was observed.

Cranston et al., Direct Surface Force Measurements of Polyelectrolyte Multilayer Films Containing Nanocrystalline Cellulose, Langmuir, 26(22), pp. 17190-17197 (2010), discloses polyelectrolyte multilayer films containing NCC and poly(allylamine hydrochloride) (PAH) that make up a new class of nanostructured composite with applications ranging from coatings to biomedical devices.

Sassi et al., Ultrastructural Aspects of the Acetylation of Cellulose, Cellulose, 2, pp. 111-127 (1995) discloses performing an ultrastructural study of the acetylation of cellulose with well characterized cellulose samples from Valonia cell wall and tunicin tests to homogenous and heterogeneous acetylation. The results were corroborated by electron and X-ray diffraction experiments.

Cunha et al., Bi-phobic Cellulose Fibers Derivatives via Surface Trifluoropropanoylation, Langmuir, 23, pp. 10801-10806 (2007) investigates surface modification of cellulose fibers with 3,3,3-trifluoropropanoyl chloride (TFP) in a toluene suspension. The characterization of the modified fibers was performed by elemental analysis, Fourier transform infrared (FTIR), C-solid-state NMR, X-ray diffraction, thermogravimetry, and surface analysis. The hydrolytic stability of the cellulose derivatives was also evaluated.

Goussé et al., Stable Suspensions of Partially Silylated Cellulose Whiskers Dispersed in Organic Solvents, Polymer, 43, pp. 2645-2651 (2002) discloses cellulose whiskers that have undergone acid hydrolysis and partial silylation. The samples were characterized by elemental composition, X-ray diffraction analysis, FT-IR, transmission electron microcopy, and their dispersion in organic solvents of various polarities was investigated.

Goussé et al, Surface Silylation of Cellulose Microfibrils: Preparation and Rheological Properties, Polymer, 45, pp. 1569-1575 (2004) discloses suspensions of cellulose microfibrils resulting from homogenization of parenchymal cell walls that were surface silylated with, isopropyl dimethylchlorosilane. It was found that under mild silylation conditions, the microfibrils retained their morphology, but could be dispersed in a non-flocculating manner into organic solvents.

Navarro et al., Highly Hydrophobic Sisal Chemithermomechanical Pulp (CTMP) Paper by Fluorotrimethylsilane Plasma Treatment, Cellulose, 10, pp. 411-424 (2003) investigates fluorinated thin layers created on chemithermomechanical pulp (CTMP) sisal paper surfaces with fluorotrimethylsilane (FTMS) radio frequency-plasma conditions. Also investigated is the use of plasmas for in situ polymer synthesis and surface modification of films and fibers.

Yuan et al., Surface Acylation of Cellulose Whiskers by Drying Aqueous Emulsion, Biomacromolecules, 7, pp. 696-700 (2006) discloses surface acylation methods of crystalline cellulose with high hydrophobicity. Also disclosed is surface-acylated whiskers that retained their morphological and crystalline integrity and were readily dispersible in solvents of low polarity.

Siqueira et al., Cellulose Whiskers versus Microfibrils: Influence of the Nature of the Nanoparticle and its Surface Functionalization on the Thermal and Mechanical Properties of Nanocomposites, Biomacromolecules, 10, pp. 425-432 (2009) discloses nanowhiskers and microfibrillated cellulose extracted from sisal and used to reinforce polycaprolactone. The surface of both nanoparticles was chemically modified to improve their compatibiliazation with a polymeric matrix.

Grunert et al., Progress in the Development of Cellulose Reinforced Nanocomposites, Polymer Materials: Science and Engineering, 82, p. 232 (2000) investigates cellulose nanocrystals and developing new materials from bacterial cellulose prepared and topochemically modified by trimethylsilylation. Cellulose crystals improved the mechanical properties of polymers and surface modification of cellulose provided a route to enhance adhesion between the particulate and matrix phase in composites.

Junior de Menezes et al., Extrusion and Characterization of Functionalized Cellulose Whiskers Reinforced Polyethylene Nanocomposites, Polymer, 50, pp. 4552-4563 (2009) investigates chemically surface modified cellulose whiskers by grafting organic acid chlorides presenting different lengths of the aliphatic chain by an esterification reaction. The homogeneity of the nanocomposites was found to increase with the length of the grafted chains. Such procedures resulted in improved dispersion of the nanoparticles within low density polyethylene.

SUMMARY

According to an embodiment illustrated herein, there is provided a method of preparing a reinforced fluoropolymer composite, the method comprising: reacting a surface of a nanocrystalline cellulose with a fluorinated electrophile to form a fluoro-functionalized nanocrystalline cellulose in which the outer circumference of the nanocrystalline cellulose has been functionalized with fluorinated substrates or species; and contacting the fluoro-functionalized nanocrystalline cellulose with a fluoropolymer to form a fluoropolymer composite.

According to another embodiment illustrated herein, there is provided a method of preparing fluoro-functionalized nanocrystalline cellulose, the method comprising: reacting a surface of a nanocrystalline cellulose with a fluorinated electrophile under heterogeneous conditions to form fluoro-functionalized nanocrystalline cellulose; precipitating the fluoro-functionalized nanocrystalline cellulose by adding a polar antisolvent; and isolating and purifying the fluoro-functionalized nanocrystalline cellulose.

EMBODIMENTS

In general, the present disclosure relates to nanocrystalline cellulose (NCC) and methods of modifying NCCs such that they can be dispersible within a matrix of a fluoropolymer polymer composite. This disclosure is not limited to particular embodiments described herein, and some components and processes may be varied based on this disclosure. All ranges disclosed herein include, unless specifically indicated, all endpoints and intermediate values. In addition, reference may be made to a number of terms that shall be defined as follows:

The term "fluoro-functionalizing" refers, for example, to the process of attaching a fluorinated substrate or fluorine containing substituents onto a surface of an NCC.

The term "fluorinated substrate" refers, for example, to a fluorinated substance, such as a product resulting from the combination of a reagent with a fluorinated species, such as, for example, a reaction product of a silane substrate and a fluorinated electrophile.

The term "surface of the nanocrystalline cellulose" refers, for example, to the outer circumferential areas of an NCC, such as, for example, and outer circumferential areas of an NCC that contains moieties that are suitable to participate in chemical reactions.

The term "moiety" and/or "moieties" refer, for example, to a particular functional group or part of a molecule, such as, for example, the closely packed hydroxyl moieties on the surface of an NCC.

The term "surface modifier" refers, for example, to a substance, such as a fluorinated substrate, that attaches or is attached onto a surface of an NCC.

The term "non-flocculating" refers, for example, to a combination of suspended particles that do not aggregate or form small clumps, tufts or masses.

The term "fluorinated electrophile" refers, for example, to a chemical substance containing nonmetallic leaving groups such as, for example, halogens, tosylates, mesylates, alkoxides, hydroxides and the like, that are covalently bound to, for example, a fluorinated benzyl, alkyl, silane, amine, ether, ester groups and the like. Examples of alkyl fully fluorinated or semi-fluorinated fluorocarbon chains include those that contain unsaturated bonds, such as double or triple bonds, or branched chains along fluorinated or non-fluorinated portions of chains. Such fluorinated electrophiles may also function as a reagent for detecting, measuring, examining, or analyzing the degree of NCC surface functionalization, for example, by elemental analysis or infrared spectroscopy or energy-dispersive X-ray spectroscopy.

The term "mild conditions" refers, for example, to experimental conditions that are gentle such that they do not result in degradation or decomposition of the NCC particles or degradation of the functionalization reactants and reagents.

The term "homogeneity" refers, for example, to a characteristic property of compounds and elements as opposed to mixtures. The term may be used to describe a mixture or solution composed of two or more compounds or elements that are uniformly dispersed in each other.

The term "moderately polar" refers, for example, to a degree of polarity of a solvent such that when hydrophilic non-functionalized NCCs are placed therein, they are not completely dissolved, while at the same time, the solvent maintains enough polarity such that aggregation of resulting functionalized NCCs with non-polar surface modifications will be minimal.

The term "degree of polarity" refers, for example, to an amount of polarity of a solvent that may be measured by any known means in the art such as, for example, solvent polarity scales, such as dielectric constants, AN, $A_N$, B, B', B-2, BCo, $B_{KT}$, Bpe, Co, Z, K, $\in_s$, DN, SB, SPP, $\pi^*$ and the like.

The term "alkyl" refers, for example, to paraffinic hydrocarbon groups, for example, methyl, ethyl, propyl, n-propyl, isopropyl, butyl, pentyl, hexyl, octyl and the like. These groups may also be represented by the general formula $C_nH_{2n+1}$ and have a carbon chain containing, for example, from 1 to about 20 carbon atoms, such as about 2 to about 16 carbon atoms, or about 4 to about 12 carbon atoms, including isomeric forms thereof, mixtures thereof and the like. The alkyl chains may also contain fluorinated or non-fluorinated branched chains extending off of the main portion of the chain.

The term "alkoxy" refers, for example, to an alkyl group of, for example, methoxy, ethoxy, propoxy, butoxy, isopropoxy, isobutoxy and the like, and having a single bond to an oxygen atom represented by the general formula R—O, wherein R may be a carbon chain of, for example, 1 to about 20 carbon atoms, such as about 2 to about 16 carbon atoms, or about 4 to about 12 carbon atoms, including isomeric forms thereof, mixtures thereof and the like.

The term "organic solvent" refers, for example, to acetic acid, acetone, acetonitrile, benzene, 1-butanol, 2-butanol, t-butyl alcohol, carbon tetrachloride, chlorobenzene, chloroform, cyclohexane, 1,2-dichloroethane, diethyl ether, diethylene glycol, diglyme, glyme (DME), dimethylether, DMF, DMSO, dioxane, ethanol, ethyl acetate, ethylene glycol, glycerin, heptane, HMPA, HMPT, hexane, methanol, methyl t-butyl ether, methylene chloride, nitromethane, pentane, petroleum ether, 1-propanol, 2-propanol, pyridine, tetrahydrofuran (THF), toluene, triethyl amine, water, o-xylene, m-xylene, p-xylene, mixtures thereof and the like."

The term "base" refers, for example, to carbonate bases, organic amine bases and inorganic hydroxide bases. Suitable carbonate bases include for example, sodium carbonate, potassium carbonate, calcium carbonate, cesium carbonate and the like. Suitable organic amine bases include, for example, amine bases including, for example, primary amines, such as methylamine, ethylamine, propylamine, isopropylamine and aniline; secondary amines, such as dimethylamine, diethylamine, diphenylamine; tertiary amines, such as triethylamine, trimethylamine, tri-n-butylamine, diisopropylethylamine, 1,8-diazabicycloundec-7-ene (DBU), 1,8-bis(dimethylamino)naphthalene (Proton Sponge®); and tertiary aromatic amines, such as imidazole, pyridine and quinoline. Suitable inorganic hydroxide bases include, for example, sodium hydroxide, potassium hydroxide, ammonium hydroxide, calcium hydroxide, magnesium hydroxide, barium hydroxide, aluminum hydroxide, ferrous hydroxide, iron (II) hydroxide, ferric hydroxide, iron (III) hydroxide, zinc hydroxide, lithium hydroxide, mixtures thereof and the like.

The term "amorphous region" refers, for example, to areas of a material such as, for example, a cellulose fiber, characterized as having no molecular lattice structure or having a disordered or not well-defined crystalline structure, resulting in a low resistance to acid attack.

The term "paracrystalline region" refers, for example, to areas of a material such as, for example, a cellulose fiber, that is characterized as having a structure that is partially amorphous and partially crystalline, but not completely one or the other, resulting in a slightly higher resistance to acid attack as compared with amorphous regions of a material.

The term "crystalline region" refers, for example, to areas of a material such as, for example, a cellulose fiber, that has a solid characteristic with a regular, ordered arrangement of particles resulting in a high resistance to acid attack.

The term "solvent exchange" refers, for example, to a process in which a solute is removed from a first solvent and subsequently placed in a second solvent.

The term "aqueous NCC dispersion" refers, for example, to a two-phased system that is made up of NCC particles that are uniformly distributed throughout a water matrix.

The term "reinforced fluoropolymer composite" refers, for example, to a fluoropolymer composite having an amount of fluoro-functionalized NCC in which the outer circumference of the nanocrystalline cellulose has been functionalized with fluorinated substrates (e.g., fluorinated groups, species and/or molecules), and/or surface-only fluoro-functionalized nanocrystalline cellulose in which only the outer circumference of the nanocrystalline cellulose has been functionalized with fluorinated substrates (e.g., fluorinated groups, species and/or molecules), that provides enhanced mechanical strength and properties such as, for example, an enhanced modulus or tensile strength relative to a control fluoropolymer composite without fluoro-functionalized NCC.

Formation of Functionalized Nanocrystalline Cellulose

In embodiments, NCC can be obtained from cellulose fibers. These cellulose fibers are characterized in having two distinct regions, an amorphous or paracrystalline region and a crystalline region. In one embodiment, NCC can be prepared through acid hydrolysis of the amorphous or disordered paracrystalline regions of cellulose fibers that have a lower resistance to acid attack as compared to the crystalline regions of cellulose fibers. During the hydrolysis reaction, the amorphous or disordered paracrystalline regions of the cellulose fibers are hydrolyzed, resulting in removal of microfibrils at the defects. Consequently, NCC particles with rod-like shapes or needle-like shapes are produced.

The newly formed NCC particles may be exceptionally tough, with a strong axial Young's modulus and may have a morphology and crystallinity similar to the original cellulose fibers except without the presence of the amorphous or paracrystalline regions. For instance, the NCC particles may have a Young's modulus of about 100 to about 170 GPa, specifically, from about 105 to about 143 GPa, or more specifically from about 110 to about 130 GPa. The NCC particles may also have a length of about 25 to about 3000 nm, specifically, from about 35 to about 1000 nm, or more specifically from about 50 to about 700 mm. Additionally, the width of the NCC particles may further have a width of less than about 80 nm, specifically less than about 60 nm, or more specifically less than about 45 nm. In another embodiment, the NCC particles may have an aspect ratio (length:width) of about 2 to about 1000, specifically from about 3 to about 500, or more specifically from about 5 to about 350.

In another embodiment, the NCC may have a surface that is closely packed with hydroxyl groups, some of which may have been converted to sulfate esters during acid digestion. In yet another embodiment, NCC surfaces may also be carboxylated. The presence of these hydroxyl groups allows for chemical modifications to be performed on their surfaces. Thus, in one embodiment, when cellulose is used as a reinforcing material, it is critical to only functionalize the surface of the NCC such that the integrity of the strong NCC core is maintained.

Analysis of the elemental distribution of the particle by energy-dispersive X-ray spectroscopy (EDS) may be used to confirm fluorine atoms are present only on the exterior surface of the particle. The structure of the functionalized particle can also be confirmed by any technique that analyzes particle size and the particle size before and after functionalization can be compared. Techniques that are commonly used to determine NCC particle size are scanning electron microscopy (SEM), transmission electron microscopy (TEM) and/or atomic force microsocopy (AFM). Wide angle X-ray diffraction (WAXD) is used to determine the degree of crystallinity. Particle size and degree of crystallinity should be within approximately 10% before and after functionalization.

In embodiments, fluoro-functionalization may form fluoro-functionalized NCC in which the outer circumference of the nanocrystalline cellulose has been functionalized with fluorinated substrates (e.g., fluorinated groups, species and/or molecules), and/or if desired, surface-only fluoro-functionalized nanocrystalline cellulose in which only the outer circumference of the nanocrystalline cellulose has been functionalized with fluorinated substrates (e.g., fluorinated groups, species and/or molecules), by removing the charged sulfate esters and interrupt hydrogen-bond driven flocculation without compromising the crystalline nature of the NCC particle that is responsible for giving the material its strength.

In other embodiments, cellulose can be prepared for functionalization by using heterogeneous conditions to form fluoro-functionalized NCC in which the outer circumference of the nanocrystalline cellulose has been functionalized with fluorinated substrates (e.g., fluorinated groups, species and/or molecules), and/or if desired, surface-only fluoro-functionalized nanocrystalline cellulose in which only the outer circumference of the nanocrystalline cellulose has been functionalized with fluorinated substrates (e.g., fluorinated groups, species and/or molecules). Under heterogeneous conditions, the fluoro-functionalized NCC remains insoluble and a decrease in the size of the fluoro-functionalized. NCC particles is not observed. Further, any partially functionalized cellulose chains are segregated from the crystalline face of the fluoro-functionalized NCC into the reaction medium as soon as they are sufficiently soluble. In another embodiment, conditions employed for surface functionalization may also cleave the sulfate esters from the surface of the NCC and eliminate the surface charge, thereby resulting in an increase in NCC-fluoropolymer compatibility. However, in yet another embodiment, the sulfate esters do not necessarily have to be removed, as the fluorofunctional group will extend beyond the sulfate salt and shield the surrounding medium from the charge.

Modification, such as surface-only modification, of NCC may be performed by a variety of methods, including, for example, esterification, acetylation, silylation, grafting polymers on the surface and functionalization with fluorine, silane or fluorinated substrates, and the like. According to one embodiment, the NCC surface can be fluoro-functionalized using any suitable type of fluorinated electrophile. In embodiments, the fluorinated electrophile may have a fluorine content in the range of from about 20 to about 80 wt %, specifically from about 30 to about 70 wt %, or more specifically from about 40 to about 60 wt %.

In embodiments, modification (such as surface-only modification) by grafting polymerization techniques preserves the cylindrical particle shape of the NCC particles. Additionally, the molecular weight of the polymer that is grafted onto NCC particle surfaces should not exceed about 100,000 amu and should not decrease the NCC particle aspect ratio by more than a factor of about 3.

In embodiments, NCC surfaces may be modified by attaching at least one fluorinated electrophile to the surface of an NCC particle. In one embodiment, the fluorinated electrophile may extend beyond sulfate ester groups on a surface of the at least one NCC. In other embodiments, a fluoro-functionalized NCC, such as, for example, surface-only fluoro-functionalized nanocrystalline cellulose, may include at least one NCC particle in addition to at least one fluorinated electrophile. Illustrative examples of fluorinated electrophiles for fluoro-functionalization may include fluorinated electrophiles represented by formulas (1)-(3):

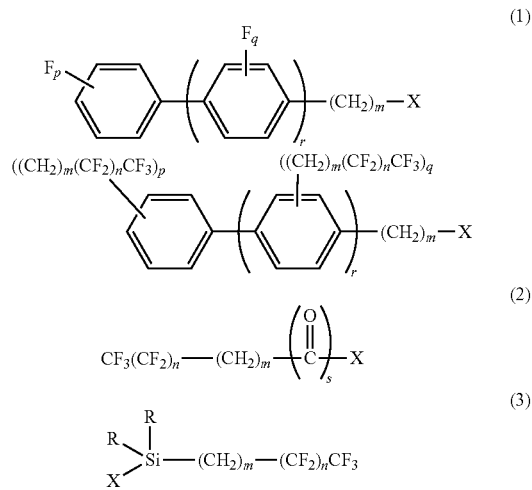

wherein (1) is a fluorobenzyl electrophile, (2) is a fluoroalkyl electrophile, (3) is a fluorosilyl electrophile, "X" may be represented by, for example, tosylate, mesylate, chlorine, bromine, iodine, alkoxide, hydroxide or the like, "R" may be represented by, for example, an alkyl group, an alkoxy group or the like, and the repeating unit "n" may be from 0 to about 11, such as from 1 to about 10, or about 2 to about 8, and the repeating unit "m" may be from 0 to about 6, such as from 1 to about 5, or about 2 to about 4, and the repeating unit "r" may be from 0 to about 5, such as from 1 to about 4, and the repeating unit "p" may be from 0 to about 5, such as from 1 to about 4, and the repeating unit "q" may be from 0 to about 4, such as from 1 to about 3, and the repeating unit "s" may be 0 or 1.

Examples of aliphatic fully fluorinated or semi-fluorinated fluorocarbon chains include those that contain unsaturated bonds, such as double or triple bonds, or branched chains along fluorinated or non-fluorinated portions of chains.

In other embodiments, surface modifications may involve electrophiles that are site-specific when reacting with hydroxyl groups on NCC surfaces. For instance, such electrophiles may be represented by a general formula such as, for example, RfX, where "X" is a leaving group that may include a halogen, tosylate, mesylate, alkoxide, hydroxide or the like, and "Rf" may contain fluorinated benzyl, alkyl, silane, amine, ether, ester groups and the like.

Additionally, in embodiments, surface functionalization with fluorinated electrophiles may be performed in a manner that does not decrease the size of fluoro-functionalized. NCC, which may be surface-only fluoro-functionalized nanocrystalline cellulose, by more than about 5% to about 10%, where some degree of solubilization and hydrolysis of surface glucose moieties should be expected. In embodiments, the fluoro-functionalized NCC particles, which may be surface-only fluoro-functionalized nanocrystalline cellulose, may have a length of about 20 to about 3000 nm, such as from about 35 to about 1000 nm, or from about 50 to about 700 nm. Additionally, the width of the fluoro-functionalized NCC particles, which may be surface-only fluoro-functionalized nanocrystalline cellulose, may further have a width of less than about 70 nm, such as less than about 50 nm, or less than about 35 nm. In another embodiment, the fluoro-functionalized NCC particles, which may be surface-only fluoro-functionalized nanocrystalline cellulose, may have an aspect ratio (length:width) of about 2 to about 1000, specifically from about 3 to about 500, or more specifically from about 5 to about 350.

Further, in embodiments, the amount of fluorine in a fluorinated electrophile can be, for example, from about 10 to about 90 wt %, specifically from about 20 to about 80 wt %. The addition of a fluorinated electrophile to the surface of the NCC particle will result in decreased surface free energy of the particle and enhanced dispersion of the NCC particles in the fluoropolymer-NCC composite.

Fluoro-Functionalization of Nanocrystalline Cellulose Surface

In embodiments, a surface modifier, such as a surface modifier of the following formula

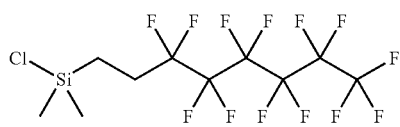 [SMILES: C[Si](C)(Cl)CCC(F)(F)C(F)(F)C(F)(F)C(F)(F)C(F)(F)C(F)(F)F]

may be used to fluoro-functionalize an NCC surface to form fluoro-functionalized NCC in which the outer circumference of the nanocrystalline cellulose is functionalized with fluorinated substrates (e.g., fluorinated groups, species and/or molecules), and/or if desired, surface-only fluoro-functionalized nanocrystalline cellulose in which only the outer circumference of the nanocrystalline cellulose is functionalized with fluorinated substrates (e.g., fluorinated groups, species and/or molecules). For example, the surface of nanocrystalline cellulose may be reacted with a fluorinated electrophile to form fluoro-functionalized nanocrystalline cellulose via a process that comprises the homogenous addition of a solubilized fluorinated reagent to the surface of a well dispersed NCC particle. In embodiments, the surface modifier of the above formula may fluoro-functionalize an NCC surface in the presence of an amine base, such as imidazole, and toluene liquid. The resulting fluorosilane fluoro-functionalized NCC, which may be fluorosilane surface-only fluoro-functionalized NCC, may thus contain the NCC with the perfluoroalkyl (chlorodimethylsilane) above surface modifier covalently attached thereto. Fluoro-functionalization of an NCC surface may be exemplified by the following reaction scheme, where "n" may be from about 5% to about 90%, specifically from about 15% to about 75%, or more specifically from about 25% to about 50% coverage of the surface:

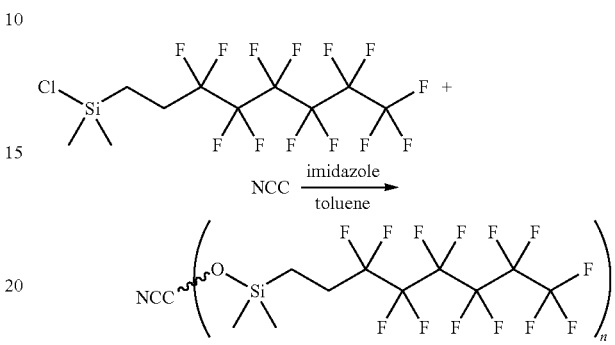

In another embodiment, fluoro-functionalization of an NCC surface may be carried out under heterogeneous conditions using carbohydrate protecting group chemistry. For example, in one embodiment, fluoro-functionalization may be carried out in a container by dispersing particles of NCC in an organic solvent with an excess amount of surface modifiers. For example, fluoro-functionalization may be carried out by dispersing particles of NCC in an organic solvent with at least 1.5 times the amount of surface modifiers that would be required to react all the surface hydroxyl groups of the NCC, such as at least 2 times the amount of surface modifiers that would be required to react all the surface hydroxyl groups of the NCC, or from about 2 times the amount of surface modifiers that would be required to react all the surface hydroxyl groups of the NCC to about 10 times the amount of surface modifiers that would be required to react all the surface hydroxyl groups of the NCC. The organic solvent may be moderately polar so as to minimize aggregation of the particles of NCC without dissolving them. The organic solvent may also be introduced by solvent exchange beginning from an aqueous NCC dispersion. The solvent may also be water. Additionally, a base may be added to the organic solvent containing the particles of NCC and the surface modifier to assist in fluoro-functionalizing the surface of NCC particles and forming fluoro-functionalized NCC particles in which the outer circumference of the nanocrystalline cellulose has been functionalized with fluorinated substrates (e.g., fluorinated groups, species and/or molecules), and/or, if desired, surface-only fluoro-functionalized nanocrystalline cellulose in which only the outer circumference of the nanocrystalline cellulose has been functionalized with fluorinated substrates (e.g., fluorinated groups, species and/or molecules).

Once the desired level of surface functionalization is achieved, the fluoro-functionalized NCC particles may be isolated and removed from the organic solvent by repeated cycles of centrifugation-redispersion to wash the NCC particles and remove the reaction byproducts and unreacted reagents. The fluoro-functionalized. NCC particles may subsequently be isolated by removal of the reaction solvent and purified by triturating or extraction, such as Soxhlet extraction, as necessary. Following precipitation and removal of any residual reactants, reagents and reaction byproducts, properties of the fluoro-functionalized NCC particles may be measured using techniques such as EDS, SEM, TEM, AFM and WAXD described above.

In embodiments, when the NCC surface is fluoro-functionalized, the NCC crystalline structure may not disrupted and its shape is preserved. Such fluoro-functionalized NCC in which the outer circumference of the nanocrystalline cellulose has been functionalized with fluorinated substrates (e.g., fluorinated groups, species and/or molecules), may be, for example, surface-only fluoro-functionalized nanocrystalline cellulose in which only the outer circumference of the nanocrystalline cellulose has been functionalized with fluorinated substrates (e.g., fluorinated groups, species and/or molecules), may have specific shape, including, for example, a rod-like crystalline nanoparticle or a needle-like crystalline nanoparticle. Further, fluoro-functionalized NCC particles may have a percent surface functionalization of about 5 to about 90 percent, specifically of about 15 to about 75 percent, and more specifically of about 25 to about 50 percent.

In embodiments, the average degree of silylation may be determined by a known means, such as, for example, inductively coupled plasma spectrometry. Further, thermal properties of the fluoro-functionalized NCC particles may be determined by any means known in the art, for example, thermal gravimetric analysis and differential scanning calorimetry.

Application of Fluoro-Functionalized Nanocrystalline Cellulose

In embodiments, fluoro-functionalized NCC particles in which the outer circumference of the nanocrystalline cellulose has been functionalized with fluorinated substrates (e.g., fluorinated groups, species and/or molecules), and/or surface-only fluoro-functionalized nanocrystalline cellulose in which only the outer circumference of the nanocrystalline cellulose has been functionalized with fluorinated substrates (e.g., fluorinated groups, species and/or molecules), may be incorporated into various polymer composites to form a reinforced fluoropolymer composite. For example, in one embodiment, such fluoro-functionalized NCC particles may be dispersed in a fluoropolymer forming a reinforced fluoropolymer composite. For example, the fluoro-functionalized NCC particles can be dispersed in a fluoropolymer in an amount of about 0.1 to about 50 wt %, such as about 0.2 to about 20 wt %, or about 0.5 to about 15 wt %. The nanocomposite material containing NCCs can have improved mechanical properties including increased tensile strength, toughness, and/or a percentage ultimate strain determined using, for example, a universal Instron testing machine (Instron, Norwood, Mass.).

Illustrative examples of fluoropolymers may include, for example, include fluoroplastics, fluororesins, thermoelastomers, fluoroelastomers, polyperfluoroether elastomers, poly(propylene-tetrafluoroethylene), perfluoroalkyoxy polymer resin, copolymers of vinylidene fluoride and hexafluoropropylene, terpolymers of vinylidene fluoride, hexafluoropropylene and tetrafluoroethylene, mixtures thereof and the like.

Commercially available fluoroelastomers can include, for example, VITON® A: copolymers of hexafluoropropylene (HFP) and vinylidene fluoride (VDF or VF2); VITON® B: terpolymers of tetrafluoroethylene (TFE), vinylidene fluoride (VDF) and hexafluoropropylene (HFP); VITON® GF: tetrapolymers of TFE, VF2, HFP); as well as VITON® E; VITON® E-60C; VITON® E430; VITON® 910; VITON® GH; and VITON® GF. The VITON® designations are Trademarks of E.I. DuPont de Nemours, Inc. (Wilmington, Del.) and are also referred herein as "VITON." Other commercially available fluoroelastomers can include those available from 3M Corporation (St. Paul, Minn.) including, for example, DYNEON™ fluoroelastomers, AFLAS® fluoroelastomers (e.g., a poly(propylene-tetrafluoroethylene)), and FLUOREL® fluoroelastomers (e.g. FLUOREL®II (e.g., LII900) a poly(propylene-tetrafluoroethylenevinylidenefluoride), FLUOREL® 2170, FLUOREL® 2174, FLUOREL® 2176, FLUOREL® 2177, and/or FLUOREL® LVS 76. Additional commercially available fluoroelastomer materials can include the "tecnoflons" identified as FOR®-60KIR, FOR®-LHF, FOR®-NM, FOR®-THF, FOR®-TFS, FOR®-TH, and FOR®-TN505, available from Solvay Solexis (West Deptford, N.J.). Amounts of the fluoropolymer may be, for example, from about 50 to about 99.9 wt %, specifically from about 80 to about 99.8 wt % or more specifically from about 85 to about 99 wt %.

In embodiments, the polymer matrix can include polymers cross-linked with an effected curing agent (also referred to herein as cross-linking agent or cross-linker) to form elastomers that are relatively soft and display elastic properties. For example, when the polymer matrix uses a vinylidenefluoride-containing fluoroelastomer, the curing agent can include, a bisphenol compound, a diamino compound, an aminophenol compound, an amino-siloxane compound, an amino-silane, and/or a phenol-silane compound. An exemplary bisphenol cross-linker can be VITON® Curative No. 50 (VC-50) available from E. I. du Pont de Nemours, Inc. VC-50 can be soluble in a solvent suspension and can be readily available at the reactive sites for cross-linking with, for example, VITON®-GF (E. I. du Pont de Nemours, Inc.).

In another embodiment, the dispersion of fluoro-functionalized NCC in a fluoropolymer may be coated in a number of methods including, for example, by spray, flow, dip or other methods of the like, or cast onto substrates and cured to produce thin films. Thin films having the fluoro-functionalized NCC incorporated into fluoropolymer composites may also be developed by other known means, including, for example, solution-based patterning and deposition techniques and compounding techniques. Solution-based techniques may include, for example, spin coating, solution casting, dip coating, flow coating, painting, brush coating, roller coating, pad application, stencil/screen printing, flexography, gravure, offset printing, ink jet-printing, micro-contact printing, and the like, or a combination of these processes. For example, gap coating can be used to coat a flat substrate, such as a belt or plate, whereas flow coating can be used to coat a cylindrical substrate, such as a drum or a roll substrate. Various layer-forming techniques including, coating techniques, extrusion techniques, and/or molding techniques, can be applied to form the nanocomposite material. Additionally, compounding techniques may be performed by conventional mechanical mixing including, for example, roll mill, internal batch mixing or extruder techniques.

Following the application of the composite dispersion, a curing process can be conducted including, e.g., evaporation, irradiation, drying, hardening, and/or thickening process. The curing process can be determined by the polymer(s) and the curing agent(s) used. In exemplary embodiments, the curing process for forming the nanocomposite material can include, for example, a step-wise curing process.

In embodiments, the desired concentration of fluoro-functionalized NCC particles in which the outer circumference of the nanocrystalline cellulose has been functionalized with fluorinated substrates (e.g., fluorinated groups, species and/or molecules), and/or surface-only fluoro-functionalized nanocrystalline cellulose in which only the outer circumference of the nanocrystalline cellulose has been functionalized with fluorinated substrates (e.g., fluorinated groups, species and/or molecules), may be dispersively mixed (or compounded) into a composite, where the fluoro-functionalized NCC particles are substantially non-agglomerated or non-agglomerated (for example, less than 5% by weight of the fluoro-functionalized NCC particles are agglomerated, or less than 1% by weight of the fluoro-functionalized NCC particles are agglomerated, or none of the fluoro-functionalized. NCC particles are agglomerated) and substantially uniformly dispersed in the composite. For example, in embodiments, the concentration (per unit volume, such as per liter, or per milliliter) of the fluoro-functionalized NCC particles may be within ±3% of an average concentration of the fluoro-functionalized. NCC particles in the entire composite, or the concentration (per unit volume, such as per liter, or per milliliter) of the fluoro-functionalized NCC particles may be within ±1% of an average concentration of the fluoro-functionalized NCC particles in the entire composite, or the concentration (per unit volume, such as per liter, or per milliliter) of the fluoro-functionalized NCC particles may be constant throughout the entire composite.

In embodiments, fluoro-functionalized NCC particles in which the outer circumference of the nanocrystalline cellulose has been functionalized with fluorinated substrates (e.g., fluorinated groups, species and/or molecules), and/or surface-only fluoro-functionalized nanocrystalline cellulose in which only the outer circumference of the nanocrystalline cellulose has been functionalized with fluorinated substrates (e.g., fluorinated groups, species and/or molecules), may be combined with the fluoropolymer to form a master batch of the fluoropolymer composite. For example, the master batch may comprise fluoro-functionalized NCC particles dispersed in the fluoropolymer and result in a solid-solid dispersion, such as a two-phase system where one phase is finely divided fluoro-functionalized NCC particles, such as in the colloidal size range (for example, in the range between 1 nanometer and 1 micron), distributed throughout a bulk substance, the fluoro-functionalized NCC particles being the dispersed or internal phase, and the fluoropolymer (which may be a neat fluoropolymer or a blend of one or more fluoropolymers) the continuous phase. In embodiments, the weight percent of the fluoro-functionalized NCC particles in the master batch (and/or the final fluoropolymer composite) plus the weight percent of the fluoropolymer equals 100%.

For example, the methods of the present disclosure may include the use of a previously prepared master batch of the fluoropolymer composite, followed by lowering the concentration of fluoro-functionalized NCC particles to a predetermined level by a let-down process, where the master batch is compounded with a neat fluoropolymer, which may or may not be the same fluoropolymer (or blend of fluoropolymers) employed to form the master batch, and possibly a coupling agent or other optional ingredients described herein, resulting in a compounded fluoropolymer composite in which the fluoro-functionalized NCC particles are substantially non-agglomerated and substantially uniformly dispersed in a fluoropolymer matrix.

In embodiments, optional components described in the present disclosure may be added to the master batch or after forming a master batch of the fluoropolymer composite.

In other embodiments, the fluoropolymer composite may be dispersed into an effective solvent to form a suspension. Effective solvents may include aqueous and organic solvents. An exemplary suspension may include solubilized fluoropolymer with a substantially uniformly dispersed suspension of substantially non-agglomerated or non-agglomerated (for example, less than 5% by weight of the fluoro-functionalized. NCC particles are agglomerated, or less than 1% by weight of the fluoro-functionalized NCC particles are agglomerated, or none of the fluoro-functionalized NCC particles are agglomerated) fluoro-functionalized NCC particles. For example, in embodiments, the concentration (per unit volume, such as per liter, or per milliliter) of the fluoro-functionalized NCC particles may be within ±3% of an average concentration of the fluoro-functionalized NCC particles in the entire suspension, or the concentration (per unit volume, such as per liter, or per milliliter) of the fluoro-functionalized NCC particles may be within ±1% of an average concentration of the fluoro-functionalized NCC particles in the entire suspension, or the concentration (per unit volume, such as per liter, or per milliliter) of the fluoro-functionalized NCC particles may be constant throughout the entire suspension. In embodiments, the suspensions may be sonicated or homogenized by known methods to aid in dispersing the suspension. In embodiments, the suspension may be relatively stable in a substantially uniformly dispersed state for periods of greater than one hour, or periods of greater than one day, such as periods greater than one week or greater than one month.

In embodiments, the stability of suspensions of the fluoropolymer composite dispersed into an effective solvent is increased compared with other fluoropolymer suspensions. The stability of a suspension is the tendency for the fluoro-functionalized NCC particles to remain suspended in the solvent and not settle out to the bottom of the container. In embodiments, a suspension of fluoro-functionalized NCC particles with fluoropolymers may be used for coating a substrate to produce a homogeneous coating on the surface. The homogeneous coating with fluoro-functionalized NCC particles of the present disclosure results avoids a reduction of mechanical strength of the coating and a reduction in the thermal and electrical conductivity of the coating, as compared with a coating containing particles and are agglomerated and not uniformly dispersed.

In embodiments of the present disclosure, the fluorine content in a fluoropolymer composite may be in an amount of, for example, from about 30 to about 90 wt %, specifically from about 40 to about 80 wt %. Additionally, the fluoropolymer composite of embodiments may have a tensile strength ranging from about 300 psi to about 10 000 psi, or from about 500 psi to about 5000 psi, or from about 700 psi to about 4000 psi or a toughness ranging from about 500 in·lbf/in$^3$ to about 10 000 in·lbf/in$^3$, or from about 1000 in·lbf/in$^3$ to about 8000 in·lbf/in$^3$, or from about 1200 in·lbf/in$^3$ to about 6000 in·lbf/in$^3$.

Characterization of Fluoro-Functionalized Nanocrystalline Cellulose

In embodiments of the present disclosure, fluoro-functionalized NCC particles may be characterized in a number of ways. For example, analysis of the local chemical composition can be carried out using energy-dispersive X-ray spectroscopy (EDS). Bulk chemical composition can be determined by elemental analysis (EA). The detailed nanocrystalline structure (shape, size, aspect ratio) of the functionalized particle can be examined by various microscopy techniques, for example, scanning electron microscopy (SEM), transmission electron microscopy (TEM) and atomic force microsocopy (AFM). Wide angle X-ray diffraction (WAXD) can be used to determine the degree of crystallinity. Fourier Transform Infrared (FT-IR) and Raman spectroscopies can be used to investigate vibrational modes and functional groups present on the particle. Dynamic light scattering (DLS) can be used to determine particle size. Zeta potential measurements can be used to determine the surface charge and density. Thermal gravimetric analysis (TGA) and differential scanning calorimetry (DSC) can be employed to understand changes in heat capacity and thermal stability of the particles.

For example, the properties of fluoropolymer composite material may be examined to ensure proper integration with a fluoro-functionalized NCC. Investigative procedures may include, for example, the use of scanning and mechanical analysis techniques. In one embodiment, this may include, for example, differential scanning calorimetry and dynamic mechanical analysis. Microscopy techniques such as AFM, SEM, TEM can also be used to evaluate the dispersion and film quality of composite.

The fluoropolymer composite may exhibit various optical properties. Additionally, fluoropolymer composites of embodiments also exhibit high dispersion stability. Such dispersion stability of the fluoropolymer composite may be characterized by changes in temperature. Stability of the fluoropolymer composite can be evaluated using the microscopy imaging techniques described above before and after exposure to increased temperatures.

According to one embodiment of the present disclosure, the homogeneity of NCC dispersed in the fluoropolymer composite, may be determined. In one embodiment, the homogeneity of NCC dispersion in the fluoropolymer composite may be visualized, for example, by using microscopy imaging techniques, including, for example, AFM, SEM, TEM and EDS techniques. Additionally, surface free energy of the NCC fluoropolymer composite may be calculated by, for example, using the Lewis Acid-Base method from the results of the contact angle measurement using Fibro DAT1100 instrument (Fibro Systems AB, Sweden).

The present disclosure addresses some or all of the above described problems and also provides a description of the functionalization of NCC surfaces with functional groups known to adhere best to CHF-based fluoropolymers including, for example, fluorinated hydrocarbons and fluorinated alkylsilanes, resulting in an increase in the strength of the polymer/filler interaction allowing for non-flocculating dispersion of the reinforced cellulose within the matrix.

Surface treated NCC biocomposites in embodiments may have mechanical properties superior to that of pure fluoropolymers, form stable, non-flocculating dispersions in fluoropolymer matrices and decrease surface free energy of NCC surfaces. In general, the incorporation of fluorine-containing groups improves solubility without sacrificing thermal stability, and affords materials with low dielectric constants and low water absorption. Additionally, fluorination also induces both hydrophobic and oleophobic properties resulting in especially low-energy surfaces. Embodiments of the present disclosure thus describes surface modified NCCs that are dispersed in a fluoropolymer matrix to improve mechanical robustness, reduce environmental impact and facilitate strong intermolecular non-covalent interactions between tough crystalline cellulose fillers and a fluoropolymer matrix.

EXAMPLES

NCC Surface Functionalization

Example 1

Functionalization of NCC Surface with Perfluoroalkyl Dimethylchlorosilane

A suspension with the desired amount of nanocrystalline cellulose (2 grams in 100 grams methanol; 2 wt %) was solvent exchanged to acetone and then to dry toluene by several successive centrifugations and redispersions. Sonication was performed after each solvent exchange step. The suspension was transferred to a 3-neck round bottom flask and purged with argon. An excess of heptadecafluoro-1,1,2,2-tetrahydrodecyl)dimethylchlorosilane (available from Gelest Inc.) was added dropwise to the stirring suspension. Following silane addition a solution of organic amine base (such as imidazole) was added dropwise and the reaction temperature was monitored such that the reaction did not exceed 50° C. The reaction was stirred at room temperature for 16 hours. Following this, the modified materials were centrifuged and washed with ethanol four times at 10,000 revolutions per minute and 10° C. for 15 minutes in each step. The functionalized cellulose was dried en vacuo at 40° C. for 24 hours.

Example 2

Functionalization of NCC Surface with 2H,2H,3H,3H-Perfluorodecanoic Acid

A suspension with the desired amount of nanocrystalline cellulose (2 grams in 100 grams methanol; 2 wt %) was solvent exchanged to acetone and then to dry toluene by several successive centrifugations and redispersions. Sonication was performed after each solvent exchange step. The suspension was transferred to a 3-neck round bottom flask and an excess of 2H,2H,3H,3H-perfluoroundecanoic acid (available from SynQuest Laboratories) was added to the stirring suspension followed by a catalytic amount of p-toluenesulfonic acid. The surface modification of the cellulose nanostructures were conducted at 105° C. for up to 24 hours. Following surface treatment, the material was purified and dried as in Example 1.

NCC Composite Formation

Example 3

Preparation of a Functionalized NCC/Fluoropolymer Master Batch

About 2 grams of functionalized NCC (prepared in Example 1) and about 65 grams of VITON GF (available from E. I. du Pont de Nemours, Inc.) were heated to about 100° C. and mixed using an internal compounder, such as a HAAKE PolyLab Rheomix Mixer, at a rotor speed of about 20 revolutions per minute for about 40 minutes to form about 67 grams of polymer composite containing 3 wt % of nanocrystalline cellulose. Different loadings of functionalized NCC were prepared by this extrusion let-down process.

Example 4

Preparation of a Functionalized NCC/VITON Coating Composite

A NCC/VITON coating dispersion was prepared by mixing the compounded NCC/VITON material prepared from Example 3 with either AO700 curing agent (N-(2-aminoethyl)-3-aminopropyltrimethoxysilane, available from United Chemical Technologies, Inc) or metal oxides (magnesium oxide and/or calcium hydroxide) and bisphenol VC-50 curing agent (VITON Curative No. 50 available from E. I. du Pont de Nemours, Inc.) in methyl isobutyl ketone (MIBK). The resulting coating dispersion was then coated onto a suitable (e.g.

aluminum paper or metalized Mylar or glass) substrate by either draw or flow coating, or casting in a mold. The coating was allowed to evaporate most of the solvent, followed by curing at ramp temperatures, e.g., at about 149° C. for about 2 hours, and at about 177° C. for about 2 hours, then at about 204° C. for about 2 hours, and then at about 232° C. for about 6 hours for a post cure.

Example 5

Preparation of a Functionalized NCC/VITON Coating Composite

A NCC/VITON coating dispersion was prepared by roll mixing about 0.5 grams functionalized. NCC (prepared in Example 1) and about 16.5 grams VITON GF (available from E. I. du Pont de Nemours, Inc.) in methyl isobutyl ketone. AO700 curing agent (N-(2-aminoethyl)-3-aminopropyltrimethoxysilane, available from United Chemical Technologies, Inc) in isopropyl alcohol was added to the mixed NCC/VITON solution. The same coating technique and curing process described in Example 4 were employed yielding polymer composite containing 3 weight percent of nanocrystalline cellulose. Different loadings of functionalized NCC were prepared by this roll mixing process.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of preparing a reinforced fluoropolymer composite, the method comprising:
    reacting a surface of a nanocrystalline cellulose with a fluorinated electrophile in an organic solvent to form a fluoro-functionalized nanocrystalline cellulose in which the outer circumference of the nanocrystalline cellulose is functionalized with fluorinated substrates, wherein
        the nanocrystalline cellulose comprises rod-like crystalline nanoparticles of cellulose having a crystalline structure,
        functionalization with fluorinated substrates does not decrease the size of the rod-like crystalline nanoparticles, and
        reacting the surface of the rod-like crystalline nanoparticles with the fluorinated electrophile forms a surface-only fluoro-functionalized nanocrystalline cellulose and the crystalline structure of the rod-like crystalline nanoparticles is not disrupted; and
    contacting the surface-only fluoro-functionalized nanocrystalline cellulose with a fluoropolymer to form a fluoropolymer composite; wherein
        the rod-like crystalline nanoparticles have an aspect ratio (length:width) of from about 5 to about 350, a length of from about 35 to about 1000 nm, and a width of less than about 80 nm.

2. The method of claim 1, wherein reacting the surface of the nanocrystalline cellulose with the fluorinated electrophile occurs under heterogeneous conditions.

3. The method of claim 1, wherein the surface of the nanocrystalline cellulose comprises sulfate esters, and before reacting the surface of the nanocrystalline cellulose with the fluorinated electrophile the sulfate esters are cleaved from the surface of the nanocrystalline cellulose.

4. The method of claim 1, wherein contacting the surface-only fluoro-functionalized nanocrystalline cellulose with a fluoropolymer to form a fluoropolymer composite includes forming a non-flocculating dispersion.

5. The method of claim 1, wherein reacting the surface of the nanocrystalline cellulose with the fluorinated electrophile to form surface-only fluoro-functionalized nanocrystalline cellulose comprises:
    the homogenous addition of a solubilized fluorinated reagent to the surface of a well dispersed nanocrystalline cellulose particle.

6. The method of claim 1, wherein reacting the surface of the nanocrystalline cellulose with fluorinated electrophile to form surface-only fluoro-functionalized nanocrystalline cellulose comprises:
    centrifugation-redispersion cycles to purify the surface-only fluoro-functionalized nanocrystalline cellulose.

7. The method of claim 1, wherein the fluorinated electrophile is selected from the group consisting of a fluorobenzyl electrophile, a fluoroalkyl electrophile, and a fluorosilyl electrophile.

8. The method of claim 1, wherein the fluorinated electrophile is a compound represented by a formula selected from the group of consisting of

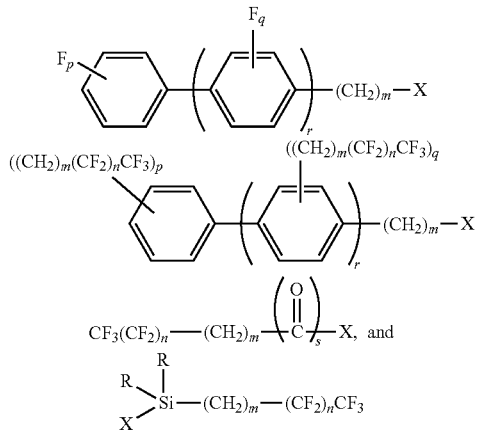

where
X is a tosylate, mesylate, halogen, alkoxide, hydroxide,
R is an alkyl group or an alkoxy group,
n is an integer from 0 to about 11,
m is an integer from 0 to about 6,
r is an integer from 0 to about 5,
p is an integer from 0 to about 5,
q is an integer from 0 to about 4, and
s is 0 or 1.

9. The method of claim 1, wherein the fluoropolymer is selected from the group consisting of fluoroplastics, fluororesins, thermoelastomers, fluoroelastomers, polyperfluoroether elastomers, poly(propylene-tetrafluoroethylene), perfluoroalkyoxy polymer resin, copolymers of vinylidene fluoride and hexafluoropropylene, terpolymers of vinylidene fluoride, hexafluoropropylene and tetrafluoroethylene, and mixtures thereof.

10. The method of claim 1, wherein the fluorinated electrophile has a fluorine content in the range of from about 20 to about 80 wt %.

11. The method of claim 1, wherein the surface-only fluoro-functionalized nanocrystalline cellulose is present in the fluoropolymer composite in an amount of about 0.1 to about 50 wt %.

12. The method of claim 11, wherein a concentration on a per milliliter basis of the surface-only fluoro-functionalized nanocrystalline cellulose is within ±1% of an average concentration of the surface-only fluoro-functionalized nanocrystalline cellulose in the entire reinforced fluoropolymer composite.

13. The method of claim 1, wherein the rod-like crystalline nanoparticles have a length of from about 50 to about 700 nm.

14. A composite film having the reinforced fluoropolymer composite made by the method according to claim 1, wherein the composite film is prepared by at least one of a solution-based or compounding procedure.

* * * * *